United States Patent
Mitani (10) Patent No.: US 6,304,404 B1
(45) Date of Patent: Oct. 16, 2001

(54) RECORDING MEDIUM DRIVING APPARATUS AND TRACKING METHOD

(75) Inventor: Akira Mitani, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/191,638

(22) Filed: Nov. 13, 1998

(30) Foreign Application Priority Data

Nov. 14, 1997 (JP) .................................................. 9-314087
Oct. 27, 1998 (JP) ................................................. 10-305841

(51) Int. Cl.$^7$ .................................................. G11B 17/00
(52) U.S. Cl. ..................... 360/69; 360/78.11; 360/77.03; 360/77.04; 324/212
(58) Field of Search ............................... 360/78.11, 77.03, 360/69, 48, 266.2, 31, 25, 75, 46, 77.04, 78.14, 78.07; 324/212, 226; 369/44.24

(56) References Cited

U.S. PATENT DOCUMENTS

| | | | |
|---|---|---|---|
| 5,329,510 | * | 7/1994 | Tsuyuguchi et al. .................. 360/25 |
| 6,018,432 | * | 1/2000 | Ukani ..................................... 360/69 |
| 6,034,838 | * | 3/2000 | Touji et al. ....................... 360/78.11 |

* cited by examiner

Primary Examiner—Alan T. Faber
(74) Attorney, Agent, or Firm—Oblon, Spivak, McClelland, Maier & Neustadt, P.C.

(57) ABSTRACT

A recording/reproducing method and apparatus having the function of tracking a head on a data track formed on a recording medium of a lower-order specifications and on a data track formed on a recording medium of the upper-order specifications. During calibration, a controller 10 causes a locally maximum value and a locally minimum value of the signal level of a sine wave signal to be sequentially stored as the table information in a storage unit 11, as a magnetic head is moved by a head driving unit 7 in a direction perpendicular to the plural tracks. The sine wave signal is generated by an optical encoder and represents a substantially sinusoidal signal which completes its full cycle on the track basis. During tracking, the locally maximum value and the locally minimum value associated with a targeted track are read out from the storage unit 11 and a target sine wave level information is generated based on the generated locally maximum value and the locally minimum value. The magnetic head is tracked to the targeted track by a lower-order tracking controlling circuit 8a based on the generated target sine wave level information.

8 Claims, 11 Drawing Sheets

RECORDING MEDIUM DRIVING APPARATUS AND TRACKING METHOD

BACKGROUND OF THE INVENTION

1. Field of the Invention

This invention relates to a recording medium driving device for driving a recording medium on which are formed plural tracks substantially parallel to one another, and to a tracking method for tracking a head with respect to the tracks formed on the recording medium substantially parallel to one another.

2. Description of the Related Art

Among conventional recording/reproducing apparatus for recording/reproducing 3.5 inch flexible magnetic discs, there is known an apparatus of the specifications in which a flexible magnetic disc is run in rotation at an rpm of the order of 300 to 600 rpm for recording/reproduction. These specifications are referred to hereinafter as the lower-order specifications. The flexible magnetic disc, recorded or reproduced on this recording/reproducing apparatus of the lower-order specifications, has a post-formatting recording capacity of approximately 1.44 Mbyte.

In recording/reproducing information signals on this recording/reproducing apparatus of the lower-order specifications, a stepping motor is used to effect tracking of the magnetic head with respect to each data track. That is, when recording/reproducing information signals for a recording medium of the lower-order specifications, the magnetic head is moved stepwise by the stepping motor along the radius of the magnetic disc for positioning the magnetic head on each data track.

On the other hand, it is required of the flexible magnetic disc to be of such specifications in which the recording density is higher than that of a disc of lower-order specifications and in which the rotational velocity is of the order of approximately 1200 to 3600 rpm for recording/reproduction to improve its recording density or data transfer rate. These specifications are referred to hereinafter as the upper-order specifications. It is required of the flexible magnetic disc used in the upper-order specifications to be of a reduced track width to increase the recording capacity to the order of 150 to 650 Mbyte.

Recently, attempts are being made to develop a recording/reproducing apparatus capable of recording/reproducing both the flexible magnetic discs of the widely used lower-order specifications and those of the upper-order specifications.

On the flexible magnetic discs of the upper-order specifications, there are pre-recorded the position information specifying the positions of the data tracks and the tracking information. With the recording/reproducing apparatus, the magnetic head can be tracked onto the respective data tracks by detecting this position information. In the recording/reproducing apparatus configured for recording/reproducing the flexible magnetic disc of the above-mentioned upper-order specifications, the magnetic head is moved radially of the recording medium, using a voice coil motor, in order to secure followup characteristics. Thus, with the recording/reproducing apparatus of the upper-order specifications, the magnetic head can be tracked onto the targeted data track to effect recording/reproduction by detecting the position information and applying tracking servo to the voice coil motor even though the track pitch is reduced as compared to that of the above-mentioned recording medium of the lower-order specifications.

However, with the recording/reproducing apparatus for recording/reproduction for both the flexible magnetic discs of the lower-order specifications and those of the upper-order specifications, the position information cannot be detected in the same manner as when recording/reproducing the flexible magnetic disc of the upper-order specifications because the position information is not recorded on the above-mentioned flexible magnetic disc of the lower-order specifications.

SUMMARY OF THE INVENTION

It is therefore an object of the present invention to provide a recording/reproducing method and apparatus having the function of permitting tracking of a magnetic head on data tracks formed on the lower-order specifications and the upper-order specifications.

In one aspect, the present invention provides a recording medium driving apparatus for driving a recording medium having a plurality of tracks formed thereon for extending substantially parallel to one another, including a head, movement means for causing movement of the head in a direction perpendicular to the tracks, sine wave detection means for detecting sine wave signals representing a substantially sinusoidal wave which completes its one period each time the head is moved by one track pitch when the head is moved by the movement means, the sine wave signals, storage means for storing the table information, calibration control means for sequentially storing, during calibration, a maximum value and a minimum value of the signal level of the sine wave signal obtained for each track as the table information in the storage means, as the head is moved by the movement means and tracking control means for reading out from the storage means the locally maximum and locally minimum values associated with the target track, generating the target sine wave level information based on the read-out locally maximum and locally minimum values and for tracking the head to the target track by the head movement means based on the generated targeted sine wave level information.

Preferably, the tracking control means controls the head movement means so that the head will be positioned at a position such that the signal level of the sine wave signal detected by the sine wave detection means is a signal level indicated by the targeted sine wave level information.

Preferably, the targeted sine wave level information is a mean value of the read-out locally maximum and locally minimum values.

Preferably, the sine wave detection means is an optical scale.

Preferably, the recording medium driving apparatus further includes loading means for detachably loading one of a first recording medium having tracks formed thereon at a first track pitch and a second recording medium having tracks formed thereon at a second track pitch narrower than the first track pitch, and discriminating means for discriminating the type of the recording medium loaded on the load means. The tracking control means performs tracking control based on the table information when the discriminating means is found to be the first recording medium.

Preferably, the recording medium is a disc-shaped recording medium.

Also preferably, the movement means is a voice coil motor.

In another aspect, the present invention provides a tracking method for tracking a head to each of a plurality of tracks formed substantially parallel to one another on a recording medium, including the steps of generating a sine wave signal representing a substantially sinusoidal wave which completes its period from track to track as the head is moved in a direction perpendicular to the plural tracks, the sine wave signal, sequentially storing a locally maximum value and a locally minimum value of the signal level of the sine wave signal as the table information in storage means, reading out the locally maximum value and the locally minimum value associated with a targeted track, generating the target sine wave level information based on the read-out locally maximum and locally minimum values and tracking the head to the target track based on the generated target sine wave level information.

According to the present invention, a sine wave signal, representing a substantially sinusoidal wave whose one cycle is competed every track, is generated at the time of calibration as the head is moved in a direction perpendicular to the plural tracks by head movement means, and the locally maximum and locally minimum values of the signal level of the sine wave signal are sequentially stored as the table information on the storage means. During tracking, the locally maximum and minimum values associated with the targeted track are read out from the storage means, and the targeted sine wave level information is generated on the basis of the generated targeted sine wave level information to track the head to the target track.

The present invention thus provides a recording/reproducing method and apparatus having the function of tracking the head to a data track formed on the lower-order disc and a data track formed on the upper-order disc.

BRIEF DESCRIPTION OF THE DRAWINGS

FIGS. 2A and 2B shows a magnetic disc usable on the recording/reproducing apparatus shown in FIG. 1, where

FIGS. 5A and 5B show a typical track gauge provided on the magnetic head unit, where

FIGS. 11A, 11B and 11C show the principle of direction detection by a seek direction detection circuit of the lower-order tracking controlling circuit, where

DESCRIPTION OF THE PREFERRED EMBODIMENTS

Referring to the drawings, preferred embodiments of the present invention will be explained in detail.

Figure 1:
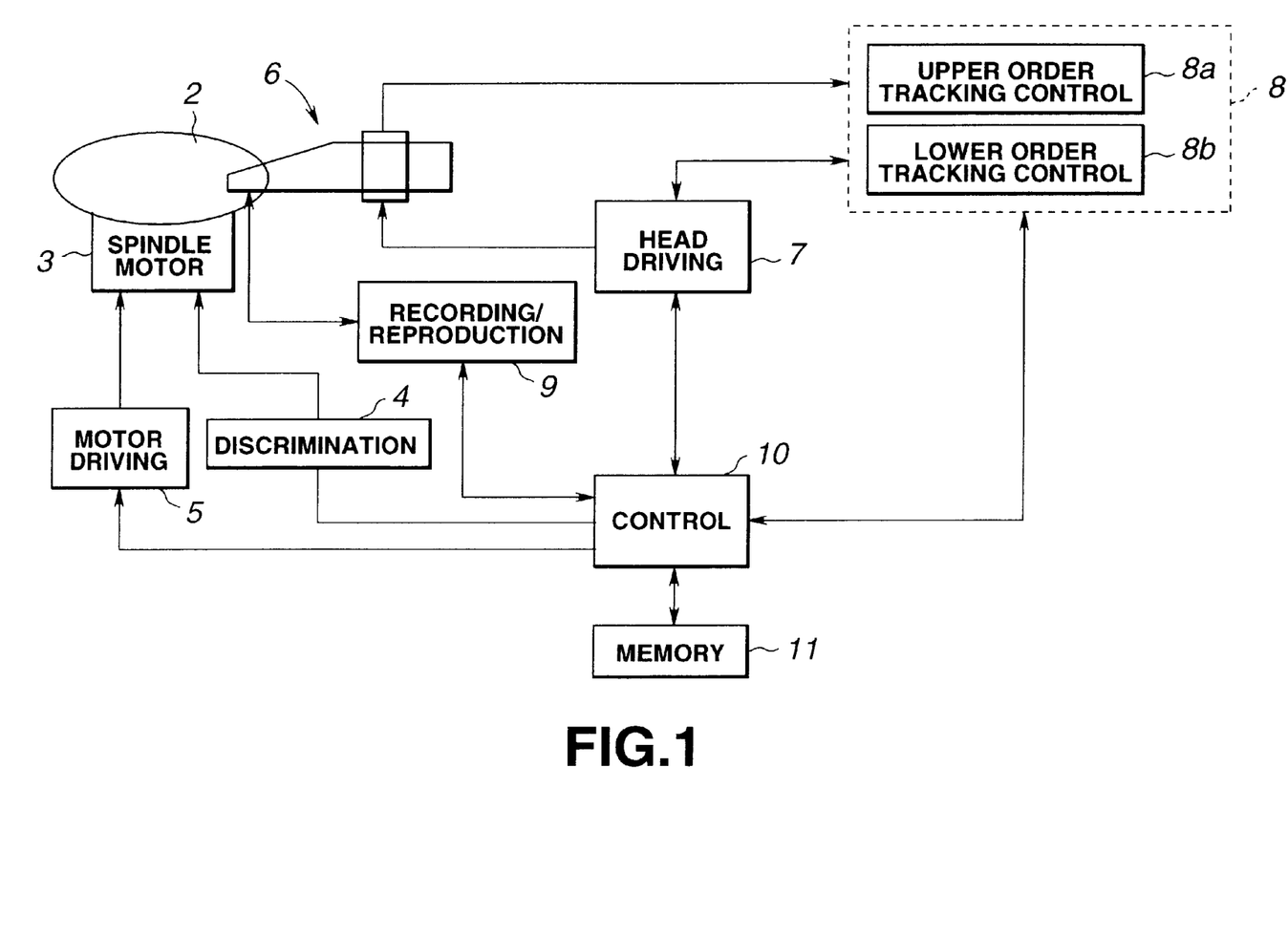
FIG. 1 is a block diagram showing the structure of a recording/reproducing apparatus embodying the present invention.

The present invention is applied to a recording/reproducing apparatus 1 configured as shown for example in FIG. 1. This recording/reproducing apparatus 1 is adapted for recording/reproducing two magnetic discs, namely a flexible magnetic disc (referred to hereinafter as a lower-order disc FD), rotationally driven at a first rotational speed of the order of 300 to 500 rpm and on which are formed data tracks at a predetermined track pitch, and another flexible magnetic disc (referred to hereinafter as an upper-order disc HFD), rotationally driven at a second rotational speed of the order of approximately 1200 to 3600 rpm and on which are formed data tracks at a track pitch narrower than the above-mentioned preset track pitch. In the following description, the lower-order disc FD and the upper-order disc HFD are sometimes collectively termed a magnetic disc.

This recording/reproducing apparatus 1 includes a spindle motor 3 for rotationally driving a magnetic disc 2, a disc discriminating unit 4 for discriminating whether the magnetic disc 2 loaded on the spindle motor 3 is the lower-order disc FD or the upper-order disc HFD, a motor driving unit 5 for driving the spindle motor 3, a head unit 6 for positioning the magnetic head on a predetermined track of the magnetic disc 2, a head driving unit 7 for driving the head unit 6, a tracking controlling unit 8 for tracking controlling the magnetic head relative to the magnetic disc and a recording/reproducing unit 9 for recording/reproducing the magnetic disc 2 by the head unit 6. The recording/reproducing apparatus 1 also includes a controller 10 for controlling the above units and a storage unit 11 connected to this controller 10.

Figure 2A:
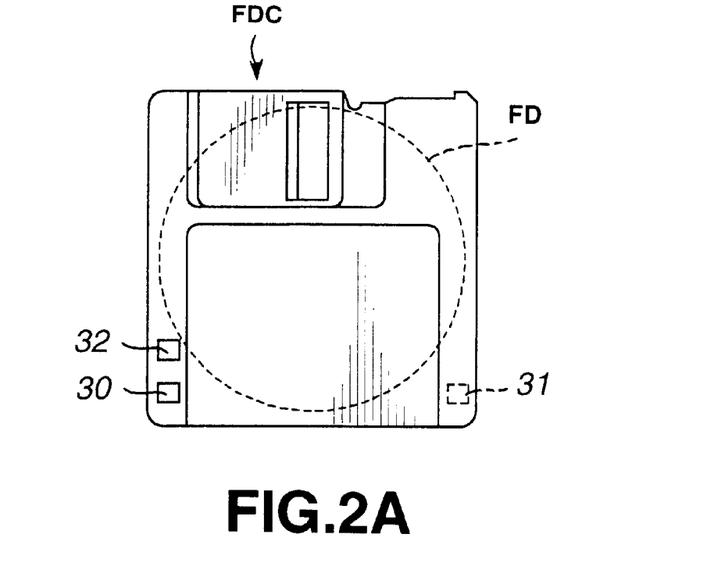
FIG. 2A is a plan view of a small-capacity floppy disc cartridge and FIG. 2B is a plan view of a large-capacity floppy disc cartridge.
Figure 2B:
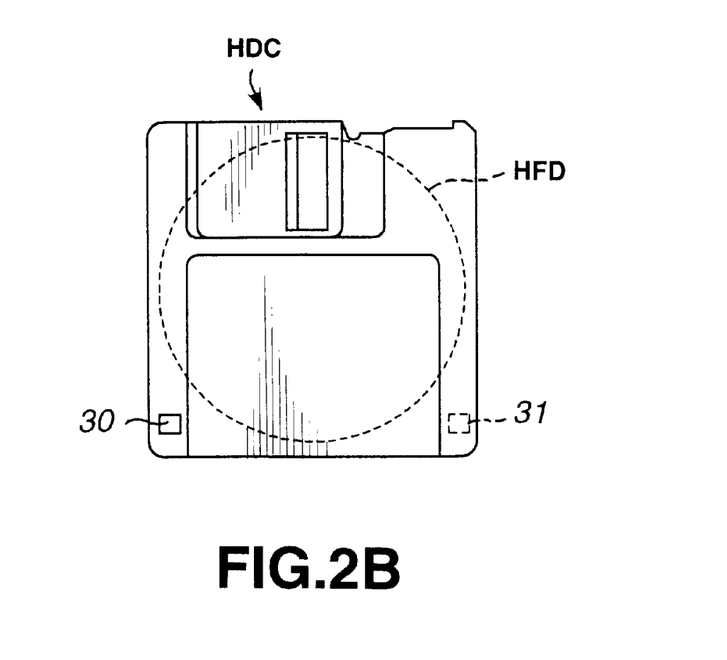

In the present recording/reproducing apparatus 1, the magnetic discs usable thereon are assumed to be a lower-order disc FD of a standard recording density with the recording capacity of the order of, for example, 2 Mbyte, held in a small-capacity floppy disc cartridge FDC, as shown in FIG. 2A, and an upper-order disc HFD of a high recording density with a recording capacity of the order of tens to hundreds of Mbyte or higher, held in a large-capacity floppy disc cartridge HDC, as shown in FIG. 2B.

The small-capacity floppy disc cartridge FDC and the large-capacity floppy disc cartridge HDC are compatible relative to each other by having the common specifications as to shape and size, and include a writing inhibiting hole 30, a first discriminating hole 31 and a second discriminating hole 32 in accordance with the specifications. The writing inhibiting hole 30 indicates a writing inhibiting state and a writing enabling state when opened and closed, respectively. The first discriminating hole 31 indicates a so-called 2HD disc having an unformatted recording capacity of approximately 2 Mbyte and other discs when opened and closed, respectively. The second discriminating hole 32 indicates the above-mentioned upper-order disc HFD of a high recording density with a larger recording capacity of tens to hundreds of Mbyte and other discs when opened and closed, respectively.

Figure 3:
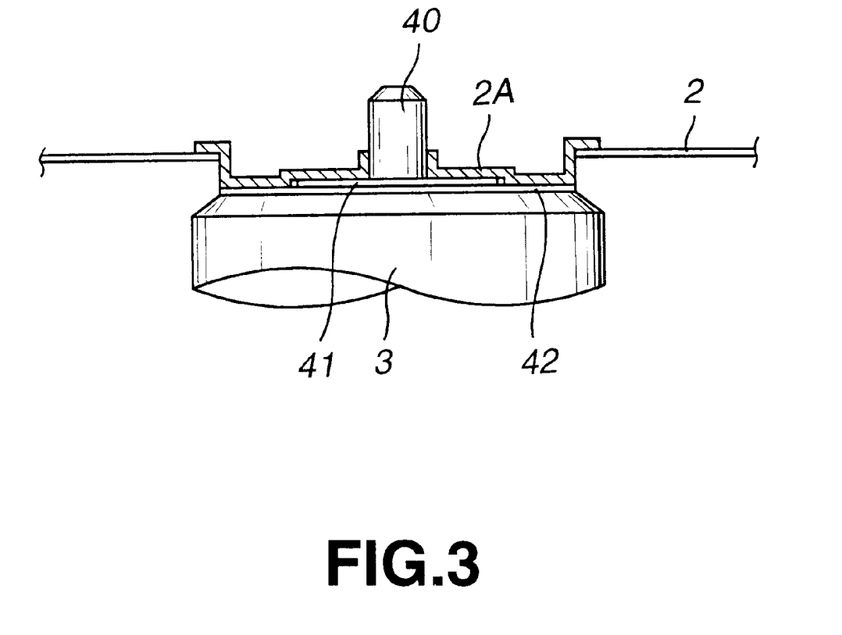
FIG. 3 schematically shows the loading state of a magnetic disc on the recording/reproducing apparatus shown in FIG. 1.

The spindle motor 3 has a disc table 4 fitted on its spindle shaft 40, as shown in FIG. 3. This disc table 41 has a magnetic sheet 42 at a position facing a metal center hub 2A of the magnetic disc 2 loaded thereon. The magnetic disc 2 is detachably held on the disc table 41 by magnetically attracting the metal center hub 2A of the magnetic disc 2 by the magnetic disc 2.

That is, the spindle motor 3 has the magnetic disc 2 detachably loaded on the disc table 41 provided on the spindle shaft 40.

This spindle motor 3 rotationally drives the magnetic disc 2 responsive to driving signals from the motor driving unit 5. The magnetic disc 2 may be the lower-order disc FD run in rotation at the first rotational speed and the upper-order disc HFD run in rotation at a second rotational speed faster than the first rotational speed.

The disc discriminating unit 4 discriminates whether or not the magnetic disc loaded on the spindle motor 3 is the upper-order disc HFD or the lower-order disc FD subject to detection of the first discriminating hole 31 and the second discriminating hole 32 provided in the small-capacity floppy disc cartridge FDC and in the large-capacity floppy disc cartridge HDC, respectively. The disc discriminating unit 4 outputs the results of discrimination to the controller 10.

The motor driving unit 5 outputs to the spindle motor 3 driving signals for rotationally driving the magnetic disc 2 loaded on the spindle motor 3. This motor driving unit 5 is connected to the controller 10 for generating driving signals responsive to the control signals from the controller 10.

The controller 10 controls the motor driving unit 5, based on the results of decision by the disc discriminating unit 4, in the following manner.

That is, if the magnetic disc 2 loaded on the spindle motor 3 is verified by the disc discriminating unit 4 to be the lower-order disc FD, the controller 10 controls the motor driving unit 5 so that the magnetic disc 2 will be run in rotation at the above-mentioned first rotational speed by the spindle motor 3. Also, if the magnetic disc 2 loaded on the spindle motor 3 is verified by the disc discriminating unit 4 to be the upper-order disc HFD, the controller 10 controls the motor driving unit 5 so that the magnetic disc 2 will be run in rotation at the above-mentioned second rotational speed by the spindle motor 3.

Figure 4:
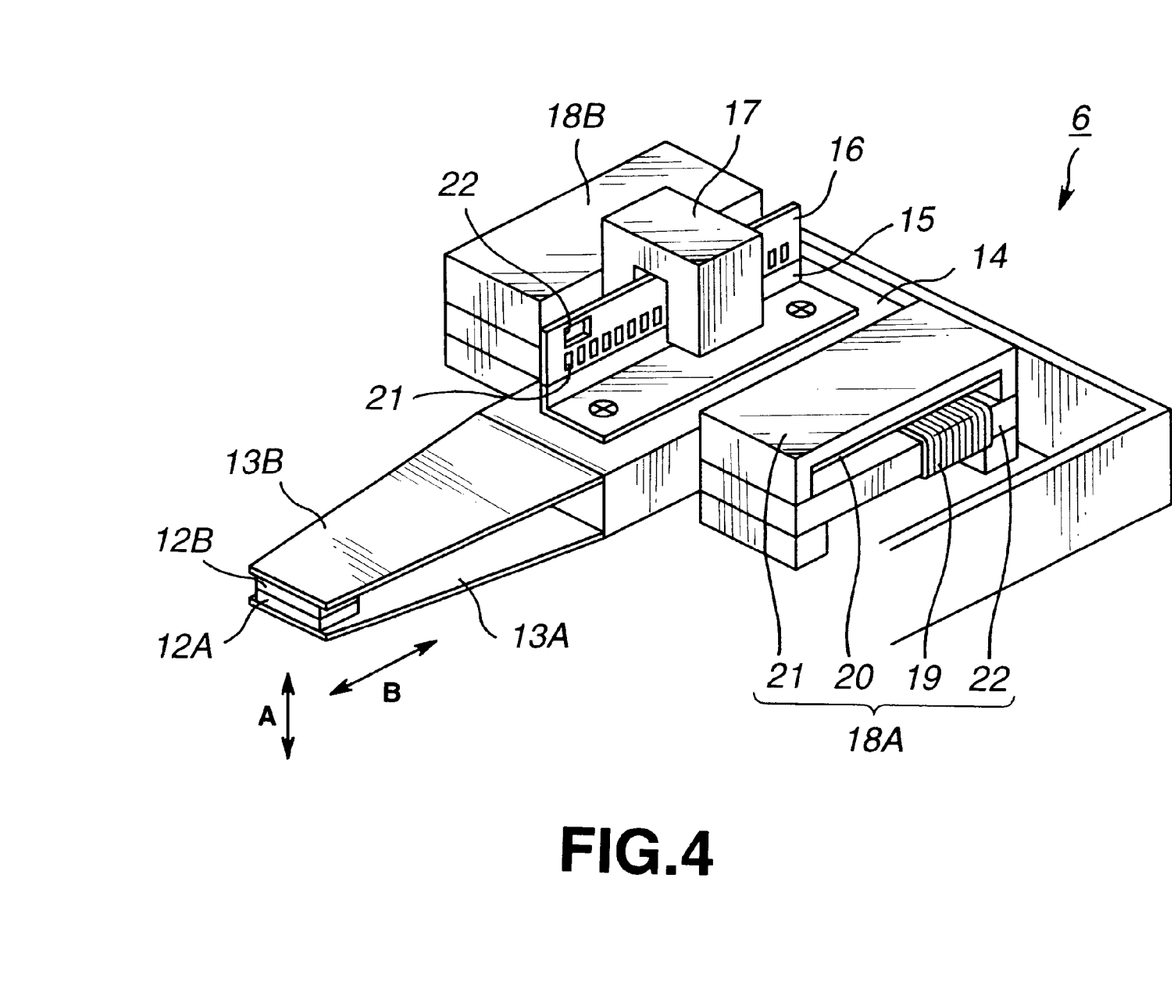
FIG. 4 is a perspective view showing the structure of a magnetic head unit of the recording/reproducing apparatus.

Referring to FIG. 4, the structure of the vicinity of the head unit 6 of the recording/reproducing apparatus according to the present invention is explained in detail.

The head unit 6 includes magnetic head units 12A, 12B, arranged on both sides of and facing the magnetic disc 2, supporting arms 13A, 13B, carrying magnetic head units 12A, 12B at distal ends thereof, a head carriage 14, connected to the supporting arms 13A, 13B, a track gauge 16 mounted on the head carriage 14 via a gauge holder 15, an optical encoder 17 mounted on a chassis, not shown, and voice coil motors VCMs 18A, 18B mounted on both sides of the head carriage 14.

The magnetic head units 12A, 12B are positioned on the magnetic disc 2 under a loading pressure applied by the supporting arms 13A, 13B. When recording/reproducing the lower-order disc FD or the upper-order disc HFD, the magnetic head units 12A, 12B are contacted with the disc surface or floated from the disc surface, respectively. Meanwhile, the magnetic head units 12A, 12B are configured for recording/reproducing an upper recording surface and a lower recording surface of the magnetic disc 2, respectively. In the magnetic head units 12A, 12B, there are built a head chip for recording/reproducing the lower-order disc FD and another head chip for recording/reproducing the upper-order disc HFD, although these head chips are not shown.

These magnetic head units 12A, 12B are fed with recording signals from the recording/reproducing unit 9 to record information signals on the lower-order disc FD or the upper-order disc HFD. The magnetic head units 12A, 12B output signals reproduced from the information signals recorded on the magnetic disc 2 to the recording/reproducing unit 9.

The VCMs 18A, 18B are each made up of a driving coil 19, a magnet 20 and yokes 21, 22. These VCMs 18A, 18B shift the head carriage 14 along the radius of the magnetic disc 2, that is in the direction indicated by arrow B in FIG. 4. By shifting the head carriage 14 in the direction indicated by arrow B, the VCMs 18A, 18B shift the magnetic head units 12A, 12B along the radius of the magnetic disc 2, that is in the direction indicated by arrow B in FIG. 4, together with the supporting arms 13A, 13B.

Also, these VCMs 18A, 18B are fed with head driving signals and tracking signals from the head driving unit 7 and the tracking controlling unit 8. These VCMs 18A, 18B are responsive to head driving signals sent from the head driving unit 7 to shift the magnetic head units 12A, 12B radially of the magnetic disc 2, that is in the direction indicated by arrow B. Also, the VCMs 18A, 18B are responsive to tracking signals sent from the tracking controlling unit 8 to shift the magnetic head units 12A, 12B in the direction indicated by arrow B along the radius of the magnetic disc 2.

Figure 5A:
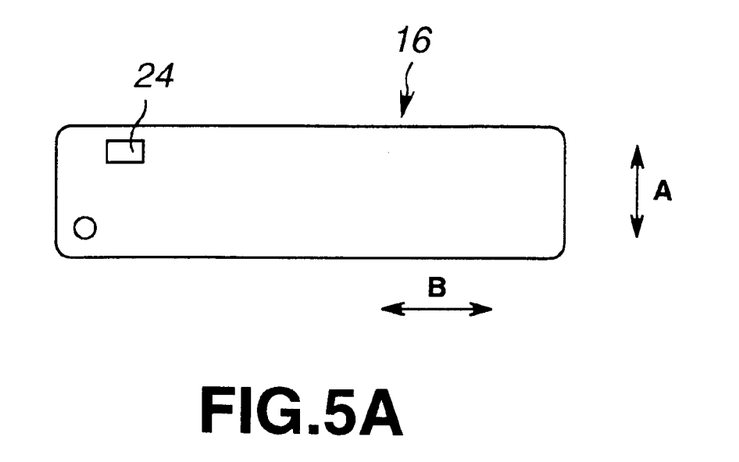
FIG. 5A is a plan view of the track gauge and FIG. 5B is an enlarged plan view showing a first opening and a second opening.
Figure 5B:
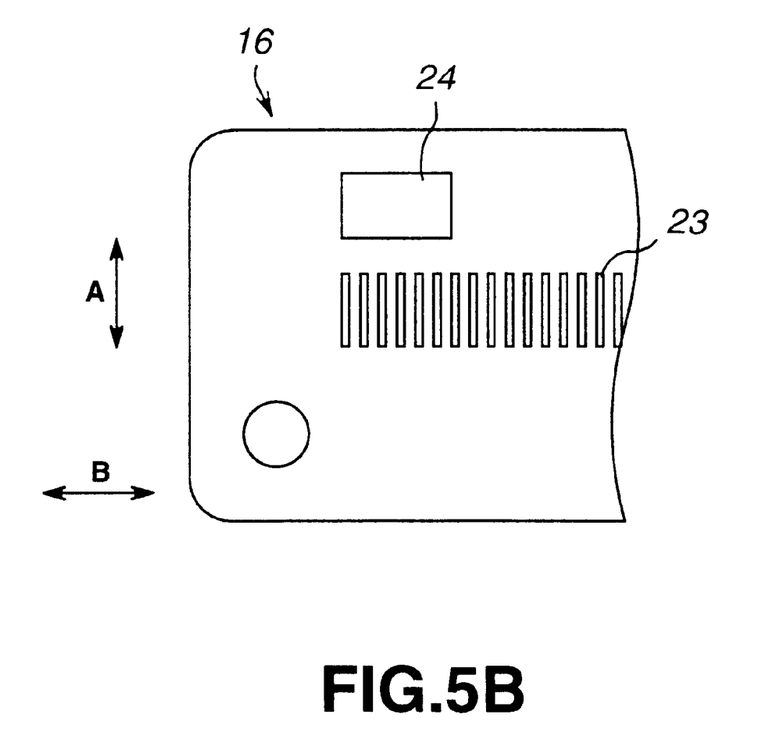

In the track gauge 16 mounted on the head carriage 14 via the gauge holder 15 are formed plural first holes 23 arrayed in the direction indicated by arrow B in FIGS. 5A and 5B, that is along the disc radius, and a second hole 24 for detecting a data area. The first holes 23 are arrayed at a pitch equal to the track pitch of the lower-order disc FD. The second hole 24 is formed in register with the radial position of the data track $T_0$ formed at the innermost radius of the data area of the magnetic disc 2.

Since the track gauge 16 is mounted via gauge holder 15 on the head carriage 14, the track gauge 16 is moved by the VCMs 18A, 18B along the radius B together with the head carriage 14 by head driving signals and tracking signals sent from the head driving unit 7 and the tracking controlling unit 8, respectively.

Figure 6:
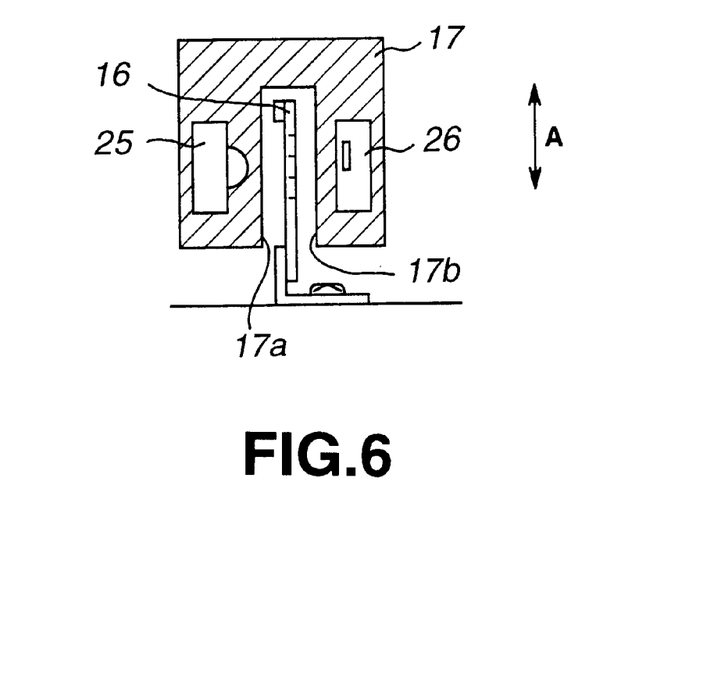
FIG. 6 is a longitudinal cross-sectional side view schematically showing the structure of an optical encoder provided in the recording/reproducing apparatus shown in FIG. 1.
Figure 7:
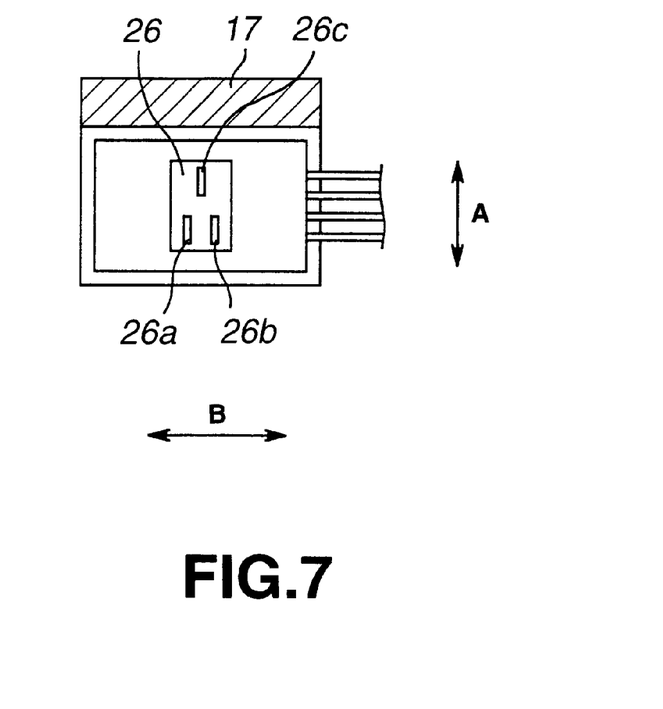
FIG. 7 is a longitudinal cross-sectional front view of the optical encoder.

The optical encoder 17 is arranged so that a light source 25 and a photosensor 26 face each other with the track gauge 16 in-between, as shown in FIG. 6. The light source and the photosensor 26 may be a light-emitting diode (LED) and a phototransistor, respectively. Since the light source 25 and the photosensor 26 are arranged for facing each other with the track gauge 16 in-between, the photosensor 26 receives the light emitted by the light source 25 and transmitted through the track gauge 16.

This photosensor 26 includes a first phototransistor 26a and a second phototransistor 26b, on which falls the light transmitted through the first holes 23, and a third phototransistor 26c, on which falls the light transmitted through the second hole 24. The first phototransistor 26a and the second phototransistor 26b are arranged with a separation (n±1/2) $T_p$, where $T_p$ denotes the track pitch of the lower-order disc FD and n is an integer.

The light from the light source 25 enters the optical encoder 17 via the track gauge 16 by the head carriage 14 being moved in the radial direction B by the VCMs 18A, 18B.

Figure 8:
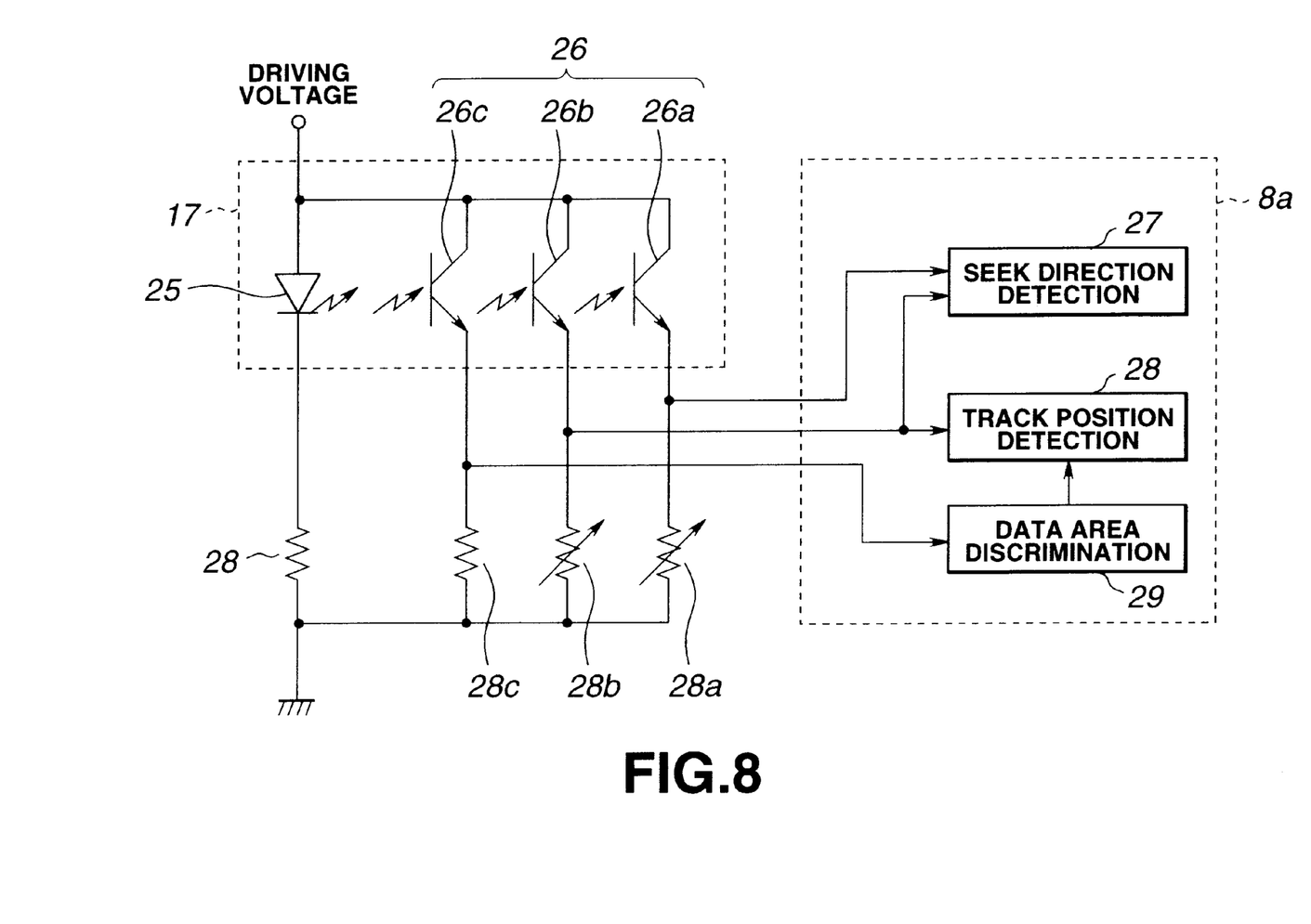
FIG. 8 shows an electrical configuration of the optical encoder and the structure of a lower-order tracking controlling circuit.

FIG. 8 shows an illustrative circuit structure of the optical encoder 17.

Specifically, the optical encoder 17 shown in FIG. 8 includes an optical center 26 comprised of the light source 25 of an LED and the phototransistors 26a to 26c. The anode of the LED and the collectors of the phototransistors 26a to 26c are connected in common to a power source terminal. The cathode of the LED is grounded via a resistor 28, while the collectors of the phototransistors 26a to 26c are grounded via resistors 28a to 28c, respectively. The junction points of the emitters of the phototransistors 26a to 26c and the resistors 28a to 28c are connected to a lower-order tracking controlling circuit 8a.

In the above-described structure of the optical encoder 17, the light source 25 emits light on application of a driving voltage across the power source terminal, whilst the phototransistors 26a to 26c are fired on detecting the light from the light source 25.

Figure 9:
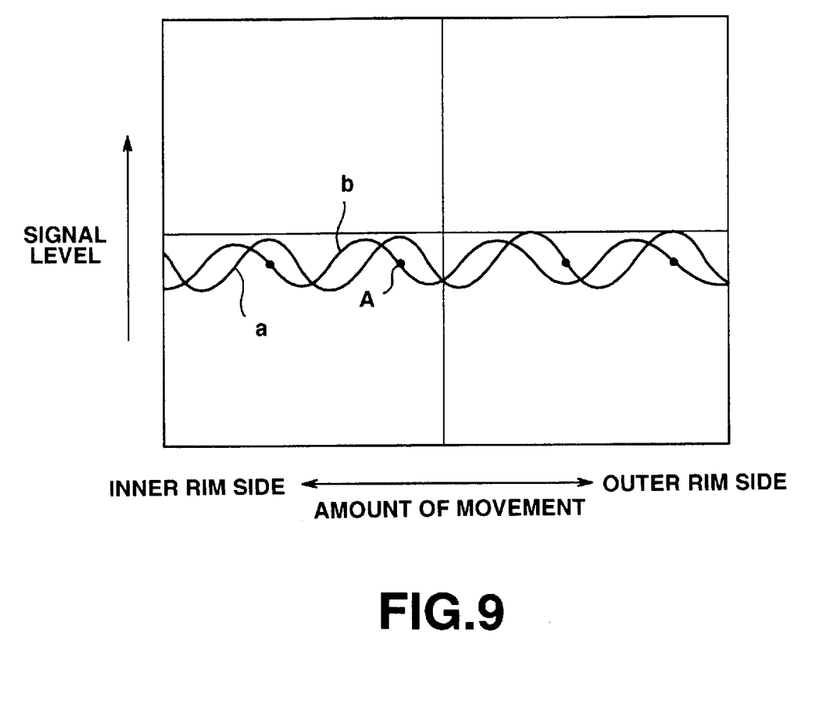
FIG. 9 is a graph showing changes in first and second light detection signals obtained by the optical encoder when the magnetic head is moved from the inner rim side towards the outer rim of the magnetic disc.

That is, in the first phototransistor 26a, there is generated a first light detection signal responsive to the input light traversing the first holes 23 of the track gauge 16, as indicated by a curve a in FIG. 9. In the second phototransistor 26b, there is generated a second light detection signal responsive to the input light traversing the first holes 23 of the track gauge 16, as indicated by a curve b in FIG. 9. Similarly, in the third phototransistor 26c, there is generated a third light detection signal responsive to the input light traversing the third holes 24 of the track gauge 16, as indicated by a curve c in FIG. 10.

The first holes 23 are formed at a pitch equal to the track pitch $T_p$ of the lower-order disc FD, while the first phototransistor 26a and the second phototransistor 26b are arranged at a separation of (n±1/2)$T_p$ from each other, so that the first and second light detection signals are of a sinusoidal waveform having a phase shift of approximately 90° from each other and a period of repetition corresponding to the track pitch $T_p$ of the lower-order disc FD.

Since the second hole 24 is formed in register with the radial position of the data track $T_0$ formed at the innermost rim of the data area of the magnetic disc 2, the third light detection signal, obtained by the third phototransistor 26c, traverses a radial position of the data track $T_0$ when the magnetic head units 12A, 12B are caused to seek from the inner rim side towards the outer rim side of the lower-order disc F. Thus, the light detection signal is changed from the low-level state L to the high-level state H, as indicated by a curve c in FIG. 10.

The head driving unit 7 drives the VMC 18 responsive to the control signals from the controller 10. That is, the present head driving unit 7 drives the VMC 18 to cause the magnetic head units 12A, 12B to perform a seeking movement in the radial direction B of the magnetic disc 2.

The tracking controlling unit 8 includes the lower-order tracking controlling circuit 8a for controlling the tracking on loading the lower-order disc FD on the spindle motor 3 and an upper-order tracking controlling circuit 8b for controlling the tracking on loading the upper-order disc HFD on the spindle motor 3. This tracking controlling unit 8 is fed with control signals from the controller 10 responsive to the results of discrimination by the disc discriminating unit 4 so that the lower-order tracking controlling circuit 8a or the upper-order tracking controlling circuit 8b generates tracking signals to control the tracking of the magnetic head relative to the data track of the magnetic disc 2.

The lower order tracking controlling circuit 8a controls the tracking of the magnetic head relative to the lower-order disc FD based on the targeted sine wave level information accorded by the controller 10.

The upper order tracking controlling circuit 8b controls the tracking of the magnetic head relative to the upper-order disc HFD based on the position information signals, such as tracking signals, previously recorded on the data track of the upper-order disc HFD.

Referring to FIG. 8, the lower-order tracking controlling circuit 8a includes a seek direction detection circuit 27, a track position detection circuit 28 and a data area discriminating circuit 29. The seek direction detection circuit 27 is fed with a first light detection signal obtained by the first phototransistor 26a of the optical encoder 17 and a second light detection signal obtained by the second phototransistor 26b, while the track position detection circuit 28 is fed with the second light detection signal obtained by the second phototransistor 26b and the data area discriminating circuit 29 is fed with the third light detection signal obtained by the third phototransistor 26c.

The track position detection circuit 28 generates a locally maximum point and a locally minimum point of the second light detection signal as the position information from one data track to another, assuming that a center point A between the locally maximum and locally minimum values of the second light detection signal shown in FIG. 9 is to be the center position of each data track. That is, the track position detection circuit 28 detects the locally maximum value NT and the locally minimum value NB to generate the position information specifying the inner rim side position and the outer rim side position from one data track to another. This track position detection circuit 28 outputs the generated position information to the controller 28.

Meanwhile, this track position detection circuit 28 recognizes the data track $TR_0$ formed at the innermost rim of the data area by the identification information formed on the innermost rim of the data area.

The seek direction detection circuit 27 detects the seeking direction of the magnetic head units 12A, 12B, based on the first light detection signal and the second light detection signal obtained by the first phototransistor 26a and the second phototransistor 26b of the optical encoder 17. Specifically, the first light detection signal and the second light detection signal are offset in phase by 90° from each other, so that the seek direction detection circuit 27 discriminates whether the second light detection signal has phase delay or phase lead with respect to the first light detection signal in the following manner in order to detect the seek direction of the magnetic head units 12A, 12B and in order to generate the seek direction information indicating in which direction the magnetic head units 12A, 12B are seeking the lower-order disc FD.

The seek direction detection circuit 27 recognizes the state of the first light detection signal being larger and smaller than a preset value as being "+" and "−", respectively.

Figure 11A:
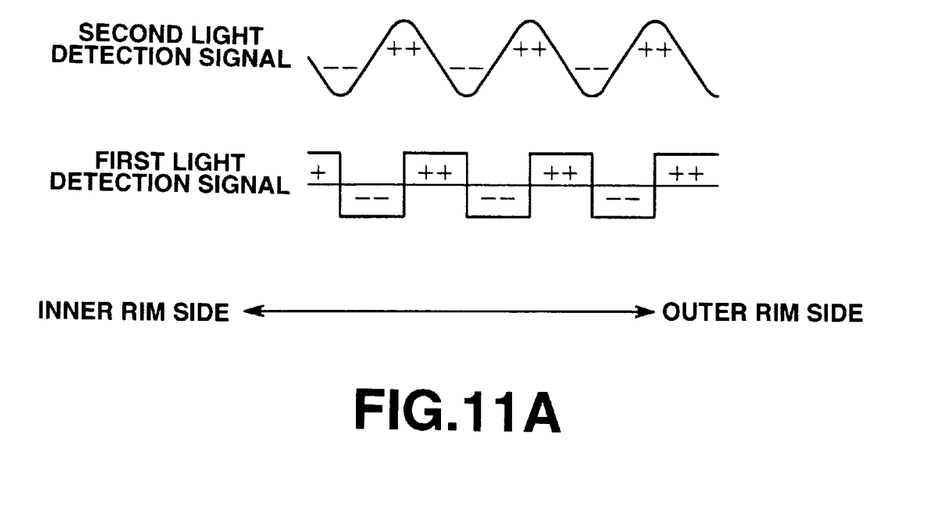
FIG. 11A shows the relation between a first light detection signal and a second light detection signal when the magnetic head is moved from the inner rim side towards the outer rim side of the magnetic disc.
Figure 11B:
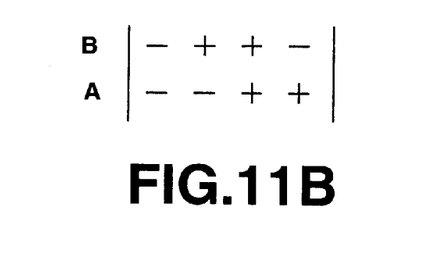
FIG. 11B shows that the first light detection signal and the second light detection signal becoming larger and smaller than a pre-set value as a result of the magnetic head movement from the inner rim side towards the outer rim side are indicated as "+" and "−", respectively.

If the magnetic head units 12A, 12B are seeking from the inner rim side towards the outer rim side of the lower-order disc FD, the second light detection signal has a phase lead with respect to the first light detection signal, with the first light detection signal and the second light detection signal being then changed as shown in FIG. 11A. If the first light detection signal and the second light detection signal are sampled every one-half period, the first light detection signal and the second light detection signal are "−, −, +, +" and "−, +, +, −", with respect to a preset signal, respectively, as shown in FIG. 11B, so that the seek direction detection circuit 27 can detect that the seeking of the magnetic head units 12A, 12B has occurred from the inner rim side towards the outer rim side of the lower-order disc FD.

Figure 11C:
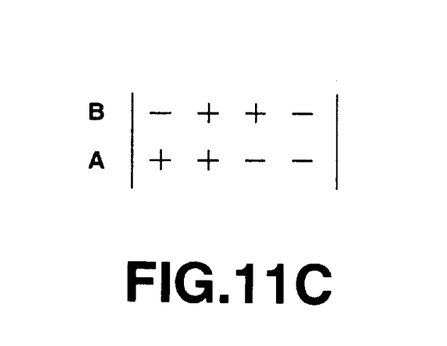
FIG. 11C shows that the first light detection signal and the second light detection signal becoming larger and smaller than a pre-set value as a result of the magnetic head movement from the outer rim side towards the inner rim side are indicated as "+" and "−", respectively.

If the magnetic head units 12A, 12B are moved from the outer rim side towards the inner rim side of the lower-order disc FD, the second light detection signal has a phase lag with respect to the first light detection signal. If the first light detection signal and the second light detection signal are sampled every one-half period, the states of the first light detection signal and the second light detection signal are "+,+,−,−" and "−,+,+,−", respectively, with respect to a preset value, so that the seek direction detection circuit 27 can detect that the seeking of the magnetic head units 12A, 12B has occurred from the outer rim side towards the inner rim side of the lower-order disc FD.

The data area discriminating circuit 29 detects changing points of the signal level of the third light detection signal obtained by the third phototransistor 26c of the optical encoder 17 to detect the boundary of the data area in which are formed plural data tracks to generate the identification information specifying the boundary position of the data area.

Figure 10:
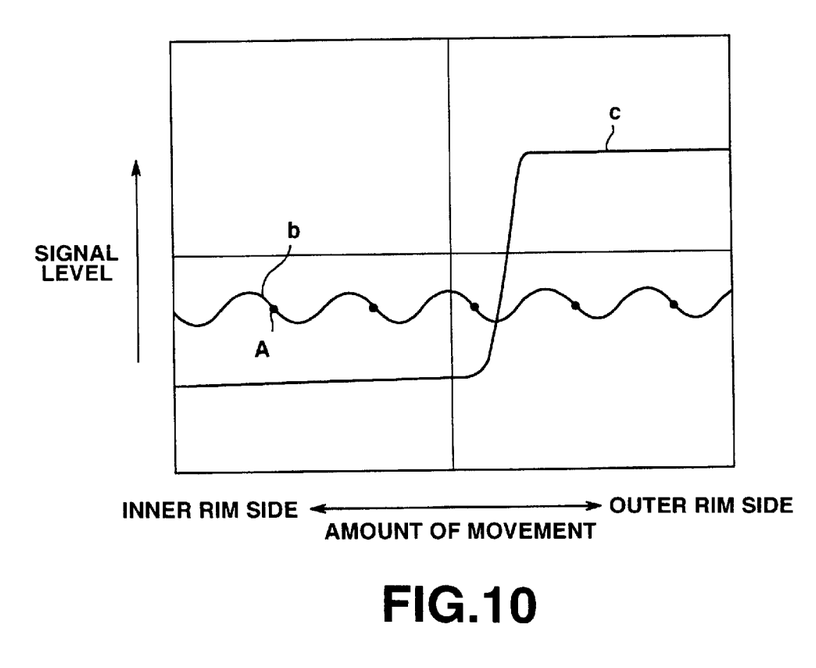
FIG. 10 is a graph showing changes in the second light detection signal and in the third light detection signal obtained by the light encoder when the magnetic head is moved from inner rim side towards the outer rim of the magnetic disc.

That is, if the magnetic head units 12A, 12B perform a seeking movement from the inner rim side towards the outer rim side on the lower-order disc FD, the third light detection signal obtained from the third phototransistor 26c is varied from the state of low level L to the state of high level H, as indicated by a curve c in FIG. 10, by the magnetic head units 12A, 12B traversing the position of the data track $T_0$ formed on the boundary of the data area carrying plural data tracks, that is the on the innermost rim of the data area. Therefore, the data area discriminating circuit 29 can detect the boundary of the data area carrying the plural data tracks by detecting the transition point of the signal level of the third light detection signal.

This data area discriminating circuit 29 outputs the identification information generated based on the third light detection signal as described above to the track position detection circuit 28 to permit the track position detection circuit 28 to recognize the data track $T_0$ formed on the innermost rim of the data area. The data area discriminating circuit 29 also outputs the generated identification information to the controller 10.

The recording/reproducing unit 9 is responsive to the control signals from the controller 10 to record or reproduce information signals of the magnetic disc 2 by the magnetic head units 12A, 12B.

The controller 10 outputs control signals to the disc discriminating unit 4, motor driving unit 5, head driving unit 7, tracking controlling unit 8 and to the recording/reproducing unit 9 to control various components.

Specifically, the controller 10 permits the disc discriminating unit 4 to discriminate whether the magnetic disc 2 loaded on the spindle motor 3 is the lower-order disc FD or the upper-order disc HFD, in order to output control signals to the motor driving unit 5, tracking controlling unit 8 and to the recording/reproducing unit 9. This causes the motor driving unit 5 to vary the rotational speed of the spindle motor 3, depending on whether the loaded disc is the lower-order disc FD or the upper-order disc HFD, in order to output tracking signals by the lower-order tracking controlling circuit 8a or by the upper-order tracking controlling circuit 8b. The recording/reproducing unit 9 performs recording/reproducing operations at a data transfer rate which is set depending on whether the loaded disc is the lower-order disc FD or the upper-order disc HFD.

In the storage unit 11 connected to the controller 10, there are stored via controller 10 the position information generated by the track position detection circuit 28 provided in the lower-order tracking controlling circuit 8a of the tracking controlling unit 8 and the recognition information generated by the data area discriminating circuit 29.

Specifically, the controller 10 causes the head unit 6 to be moved by the head driving unit 7 during calibration for the lower-order disc FD to permit the position information generated in the track position detection circuit 28 provided in the lower-order tracking controlling circuit 8a, that is the locally maximum and locally minimum values of the signal level of the sinusoidal wave signal obtained from track to track, to be stored sequentially as the table information in the storage unit 11.

Figure 12:
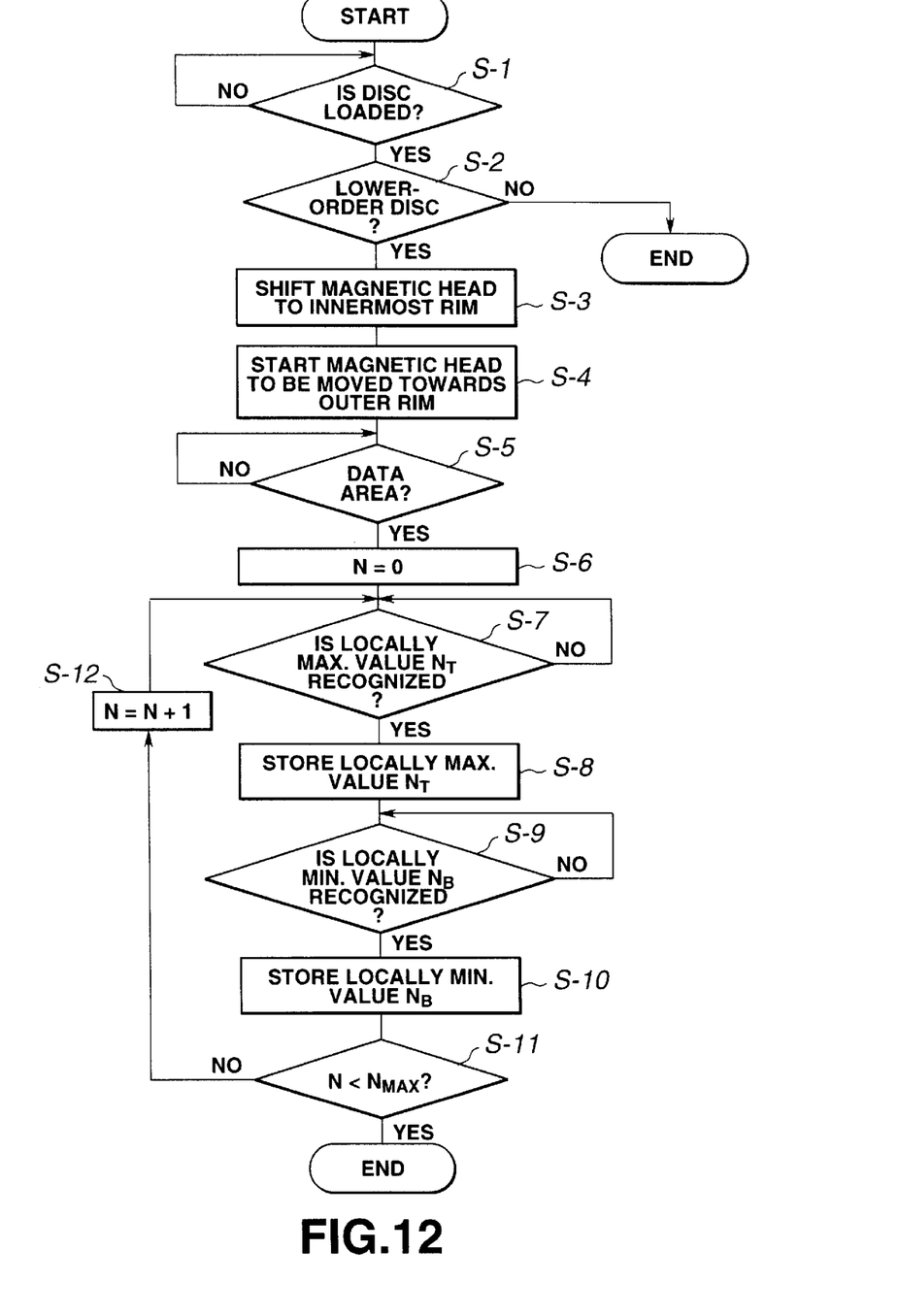
FIG. 12 is a flowchart showing an instance of storage of locally maximum and locally minimum values for respective data tracks formed on the lower-order disc.

It is noted that, if the magnetic disc 2 loaded on the spindle motor 3 is the lower-order disc FD, the controller 10 performs calibration in accordance with the sequence of operations indicated in the flowchart of FIG. 12.

First, the controller 10 checks at step S-1 whether or not the disc discriminating unit 4 has detected loading of the magnetic disc 2 on the spindle motor 3. If it is detected that the magnetic disc 2 has been loaded in position, processing transfers to step S-2. If the magnetic disc 2 has not been loaded in position, the step S-1 is executed repeatedly.

At the next step S-2, it is verified, based on the results of check by the disc discriminating unit 4, whether or not the magnetic disc 2 loaded on the spindle motor 3 is the lower-order disc FD. If the magnetic disc 2 loaded on the spindle motor 3 is the lower-order disc FD, processing transfers to step S-3 and, if otherwise, the present calibration processing is terminated.

At step S-3, driving signals are sent from the head driving unit 7 to the VCMs 18A, 18B to shift the magnetic head units 12A, 12B to the innermost rim of the lower-order disc FD by the VCMs 18A, 18B.

At the next step S-4, driving signals are sent from the head driving unit 7 to the VCMs 18A, 18B to start the seeking of the magnetic head units 12A, 12B at a preset speed from the innermost rim to the outermost rim of the disc.

At the next step S-5, it is verified by the data area discriminating circuit 29 provided in the lower-order tracking controlling circuit 8a whether or not the identification information specifying the boundary position of the data area of the lower-order disc FD has been generated, that is whether or not the magnetic head units 12A, 12B have been moved up to the boundary of the data area of the lower-order disc FD. If the identification information has not been generated by the data area discriminating circuit 29, the operation of step S-5 is repeated until the generation of the identification information. If the identification information has been generated, processing transfers to step S-6.

At step S-6, the track position detection circuit 28 provided in the lower-order tracking controlling circuit 8a is caused to recognize the data track $T_0$ formed at the boundary position of the data area of the lower-order disc FD, based on the identification information generated by the data area discriminating circuit 29, with the track number N being 0 (N=0). Simultaneously, this identification information is stored in the storage unit 11.

At the next step S-7, it is checked by the track position detection circuit 28 whether or not the locally maximum value $N_T$ of the second light detection signal has been detected by the track position detection circuit 28. If the locally maximum value $N_T$ of the second light detection signal has not been detected by the track position detection circuit 28, the processing of step S-7 is repeatedly made until detection of the locally maximum value $N_T$. If the locally maximum value $N_T$ is detected, processing transfers to step S-8.

At step S-8, the locally maximum value $N_T$ of the second light detection signal detected by the track position detection circuit 28 is stored in the storage unit 11 as the position information for the data track $T_0$ having the track number N (N=0).

At the next step S-9, it is checked whether or not the locally minimum value $N_B$ of the second light detection signal has been detected by the track position detection circuit 28. If the locally minimum value $N_B$ of the second light detection signal has not been detected by the track position detection circuit 28, the processing of step S-9 is repeated until detection of the locally minimum value $N_B$. On detection of the locally minimum value $N_B$, processing transfers to step S-10.

At this step S-10, the locally minimum value $N_B$ of the second light detection signal, as detected by the track position detection circuit 28, is stored as the position information for the data track $T_0$ having the track number N (N=0).

At the next step S-11, it is verified whether or not the track number N is not larger than the maximum track number $N_{MAX}$ of the data track formed in the data area of the lower-order disc FD. If the track number N is not equal to or smaller than the maximum track number $N_{MAX}$, this calibration processing is terminated. If the track number N is equal to or smaller than the maximum track number $N_{MAX}$, processing transfers to step S-12.

At step S-12, the track number N is incremented. Then, processing reverts to step S-7 to execute the processing of from step S-7 to step S-11 to store the locally maximum value $N_T$ and the locally minimum value $N_B$ of the second light detection signal detected by the track position detection circuit 28 in the storage unit 11 as the position information for the data track $T_N$ having the next track number N.

By repeatedly executing the processing from step S-7 to step S-11, the locally maximum value $N_T$ and the locally minimum value $N_B$ of the second light detection signal detected by the track position detection circuit 28 are stored as the position information in the storage unit 11 for each of the data tracks $T_0$ to $T_N$ formed in the data area of the lower-order disc FD.

Figure 13:
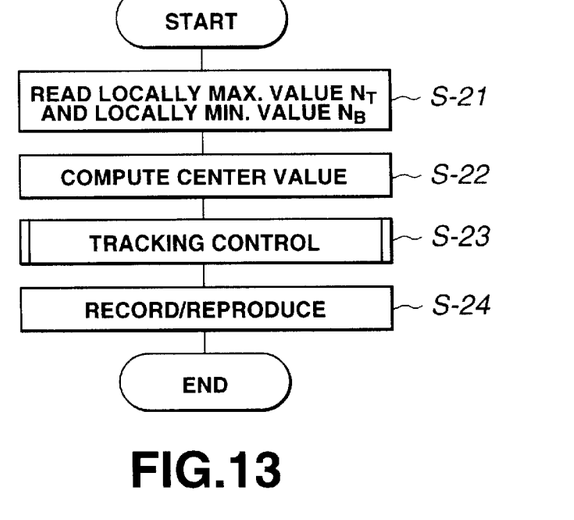
FIG. 13 is a flowchart showing an instance of recording/reproducing information signals on the lower-order disc.

The controller 10 records/reproduces information signals in accordance with the flowchart shown in FIG. 13.

First, at step S-21, the position information, that is the locally maximum value $N_T$ and the locally minimum value $N_B$, is read out with respect to the target data track $T_N$.

At the next step S-22, the mean value of the position information, that is (locally maximum value $N_T$+locally minimum value $N_B$)/2), is calculated as a tracking target value associated with the track center position.

At the next step S-23, tracking signals are outputted from the lower-order tracking controlling circuit 8a to the head driving unit 7, based on the tracking target value =(locally maximum value $N_T$+the locally minimum value $N_B$)/2, calculated at step S-22, in order to drive the VCMs 18A, 18B so that the magnetic head units 12A, 12B will be positioned at the center position of the data track $T_N$.

At the next step S-24, information signals are recorded on the lower-order disc FD by the magnetic head units 12A, 12B, or the information signals recorded on the lower-order disc FD are reproduced.

Figure 14:
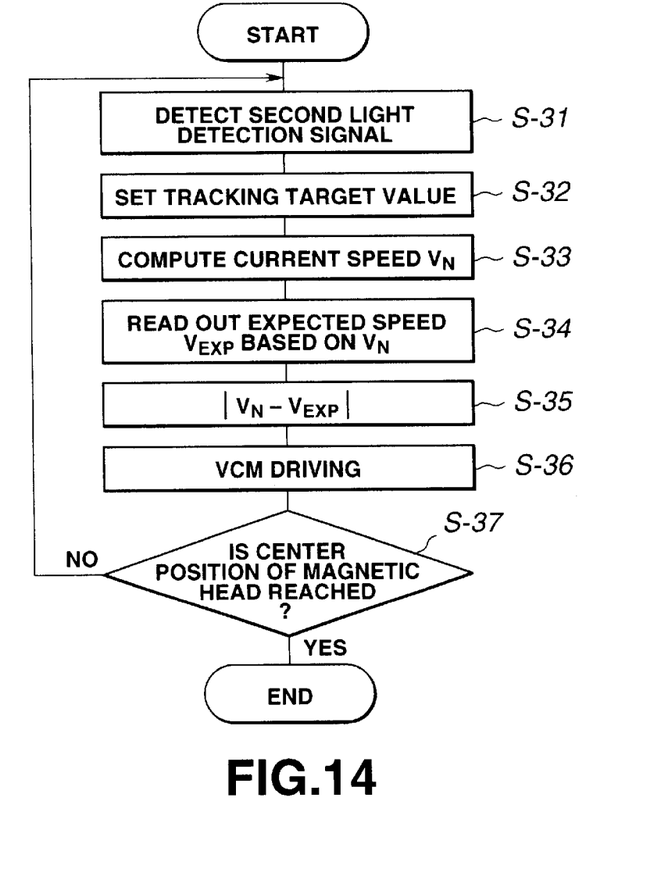
FIG. 14 is a flowchart showing an instance of controlling tracking for positioning the magnetic head on a data track formed on the lower-order disc.

The controller 10 performs tracking control for the lower-order disc FD in accordance with the sequence shown in the flowchart of FIG. 14.

First, at step S-31, the signal level of the above-mentioned second light detection signal, obtained by the optical encoder 17, is retrieved from the lower-order tracking controlling circuit 8a.

Then, at step S-32, the tracking target value for the target data track is accorded to the lower-order tracking controlling circuit 8a.

Then, at step S-33, the current speed $V_N$ of the magnetic head units 12A, 12B, seeking the lower-order disc FD, is found based on the signal level of the second light detection signal retrieved at the above-mentioned step S-31.

At the next step S-34, the expected sped $V_{EXP}$ stored in association with the locally maximum value $N_T$+the locally minimum value $N_B$ for each data track is read out based on the speed $V_N$ calculated at the above-mentioned step S-33 and the distance from the data track on which the magnetic head units 12A, 12B are positioned up to the targeted data track.

At the next step S-35, the expected speed $V_{EXP}$ is subtracted from the above-mentioned speed $V_N$ and an absolute value forming processing is performed on the resulting difference signal. A driving voltage corresponding to the result of the absolute value forming processing is generated and outputted to the head driving unit 7.

At the next step S-36, the driving voltage is applied from the head driving unit 7 to the VCMs 18A, 18B to shift the magnetic head units 12A, 12B to the target track by the VCMs 18A, 18B. The lower-order tracking controlling circuit 8a accords the tracking control signal to the head driving unit 7 so that the signal level of the second light detection signal obtained by the above-mentioned optical encoder 17 will be coincident with the tracking target value on the target track accorded by the controller to perform tracking control for tracking the magnetic head units 12A, 12B with respect to the targeted data track by the above-mentioned head driving unit 7.

At step S-37, the signal level of the second light detection signal is retrieved from the track position detection circuit 28 to check whether or not the signal level of the second light detection signal is coincident with the tracking target value on the target track, that is whether or not the magnetic head units 12A, 12B are positioned on the targeted data track. If it is found that the magnetic head units 12A, 12B are not positioned on the target data track, processing reverts to step S-21 to repeat the processing from step S-21 to step S-27. If it is found that the magnetic head units 12A, 12B are positioned on the target data track, the processing shown in FIG. 14 is terminated.

That is, the controller performs control to read out the locally maximum and locally minimum values associated with the targeted track from the storage unit 11 at the time of tracking for the lower-order disc FD to generate the targeted sine wave level information based on the read-out locally maximum and locally minimum values to send the generated target sine wave level information to the lower-order tracking controlling circuit 8a. The lower-order tracking controlling circuit 8a performs tracking control for tracking the magnetic head units 12A, 12B on the targeted data track by the head driving unit 7 based on the target sine wave signal level accorded by the controller 10.

The lower-order disc FD is tracking-controlled in this manner to record information signals by the magnetic head units 12A, 12B or to reproduce information signals recorded on the lower-order disc FD.

If the disc discriminating unit 4 finds that the upper-order disc HFD has been loaded on the spindle motor 3, the controller 10 outputs to the tracking controlling unit 8 a control signal which causes the tracking control to be performed by the upper-order tracking controlling circuit 8b. The upper-order tracking controlling circuit 8b reproduces address signals recorded on the upper-order disc HFD by the recording/reproducing unit 9 from the magnetic head units 12A, 12B. These address signals are entered via the recording/reproducing unit 9 and the controller 10 to the upper-order tracking controlling circuit 8b which then corrects the position of the magnetic head units 12A, 12B based on the address information to execute tracking control.

If, with the above-described recording/reproducing apparatus 1, the lower-order disc FD is loaded on the spindle motor 3, the data area discriminating circuit 29 recognizes the boundary of the data area and the seek direction detection circuit 27 recognizes the seeking direction of the magnetic head units 12A, 12B, at the same time as the tracking control is executed so that the magnetic head units 12A, 12B will be positioned at the center of each data track to record/reproduce information signals on the lower-order disc FD.

Also, if, in the recording/reproducing apparatus 1, the lower-order disc FD carrying no address signals or the like is recorded or reproduced, an LED is used as the light source 25 and the first, second and third light detection signals indicating the positions of the magnetic head units 12A, 12B are generated by the phototransistors 26a to 26c in order to perform tracking control.

What is claimed is:

1. A recording medium driving apparatus for driving a recording medium having a plurality of tracks formed thereon for extending substantially parallel to one another, comprising:

a head;

movement means for causing movement of said head in a direction perpendicular to said tracks;

sine wave detection means for detecting sine wave signals when the head is moved by said movement means, said sine wave signals representing a substantially sinusoidal wave which completes its one period each time the head is moved by one track pitch;

storage means for storing table information;

calibration control means for sequentially storing, during calibration, a maximum value and a minimum value of the signal level of said sine wave signal obtained for each track, as the table information in said storage means, as said head is moved by said movement means; and tracking control means for reading out from the storage means the locally maximum and locally minimum values associated with the target track, generating the target sine wave level information based on the read-out locally maximum and locally minimum values and for tracking said head to the target track by said head movement means based on the generated targeted sine wave level information.

2. The recording medium driving apparatus according to claim 1 wherein said tracking control means controls said head movement means so that said head will be positioned at a position such that the signal level of the sine wave signal detected by said sine wave detection means is a signal level indicated by said targeted sine wave level information.

3. The recording medium driving apparatus according to claim 1 wherein said targeted sine wave level information is a mean value of the read-out locally maximum and locally minimum values.

4. The recording medium driving apparatus according to claim 1 wherein said sine wave detection means is an optical scale.

5. The recording medium driving apparatus according to claim 1 further comprising:

loading means for detachably loading thereon a first recording medium having tracks formed thereon at a first track pitch or a second recording medium having tracks formed thereon at a second track pitch narrower than said first track pitch; and discriminating means for discriminating the type of the recording medium loaded on the loading means;

said tracking control means performing tracking control based on the table information when the discriminating means is found to be said first recording medium.

6. The recording medium driving apparatus according to claim 1 wherein said recording medium is a disc-shaped recording medium.

7. The recording medium driving apparatus according to claim 1 wherein said movement means is a voice coil motor.

8. A tracking method for tracking a head to each of a plurality of tracks formed substantially parallel to one another on a recording medium, comprising the steps of:

generating a sine wave signal as said head is moved in a direction perpendicular to the plural tracks, said sine wave signal representing a substantially sinusoidal wave which completes its period from track to track;

sequentially storing a locally maximum value and a locally minimum value of the signal level of said sine wave signal as table information in storage means;

reading out the locally maximum value and the locally minimum value associated with a targeted track;

generating the target sine wave level information based on the read-out locally maximum and locally minimum values; and tracking said head to the target track based on the generated target sine wave level information.

* * * * *

UNITED STATES PATENT AND TRADEMARK OFFICE
CERTIFICATE OF CORRECTION

PATENT NO.   : 6,304,404 B1                                              Page 1 of 1
DATED        : October 16, 2001
INVENTOR(S)  : Akira Mitani It is certified that error appears in the above-identified patent and that said Letters Patent is hereby corrected as shown below:

<u>Column 2,</u>
Line 55, change "load" to -- loading --.

<u>Column 3,</u>
Line 38, change "shows" to -- show --.

<u>Column 5,</u>
Line 23, change "4" to -- 41 --.

<u>Column 7,</u>
Lines 28 and 30, change "26ato" to -- 26a to --;
Line 41, change "a" to -- $a$ --;
Line 44, change "b" to -- $b$ --;
Lines 49 and 67, "c" to -- $c$ --.

<u>Column 11,</u>
Line 63, change "$T_o$to" to -- $T_o$ to --.

<u>Column 12,</u>
Line 33, change "sped" to -- speed --.

Signed and Sealed this

Twentieth Day of August, 2002

Attest:

JAMES E. ROGAN
*Attesting Officer*   *Director of the United States Patent and Trademark Office*